(12) United States Patent
Tanaka

(10) Patent No.: US 11,216,142 B2
(45) Date of Patent: Jan. 4, 2022

(54) OPERATION SUPPORT DEVICE

(71) Applicant: Japan Display Inc., Tokyo (JP)

(72) Inventor: Toshihiko Tanaka, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/235,020

(22) Filed: Apr. 20, 2021

(65) Prior Publication Data
US 2021/0240307 A1 Aug. 5, 2021

Related U.S. Application Data

(63) Continuation of application No. PCT/JP2019/047491, filed on Dec. 4, 2019.

(30) Foreign Application Priority Data

Dec. 28, 2018 (JP) .............................. JP2018-248627

(51) Int. Cl.
*G06F 3/044* (2006.01)

(52) U.S. Cl.
CPC .......... *G06F 3/0448* (2019.05); *G06F 3/0445* (2019.05); *G06F 3/0446* (2019.05)

(58) Field of Classification Search
CPC .... G06F 3/0448; G06F 3/0445; G06F 3/0446; G06F 3/0362; G06F 3/044; G06F 3/0393
See application file for complete search history.

(56) References Cited

U.S. PATENT DOCUMENTS

| 2015/0221426 A1* | 8/2015 | Furuki | G06F 3/0362 335/219 |
| 2019/0113985 A1* | 4/2019 | Sawada | G06F 3/0317 |
| 2019/0146546 A1* | 5/2019 | Goto | F16F 9/12 345/184 |
| 2019/0379377 A1* | 12/2019 | Ju | H01H 25/065 |

(Continued)

FOREIGN PATENT DOCUMENTS

| JP | 6342105 | 6/2018 |
| WO | WO2015174092 A1 | 11/2015 |
| WO | WO2018016242 A1 | 1/2018 |

OTHER PUBLICATIONS

International Search Report issued in International Patent Application No. PCT/JP2019/047491 dated Feb. 25, 2020 and English translation of same. 5 pages.

(Continued)

*Primary Examiner* — Amit Chatly
(74) *Attorney, Agent, or Firm* — K&L Gates LLP

(57) ABSTRACT

An operation support device supports input operations on a coordinate input device configured to detect change in electrostatic capacitance. The operation support device includes a main shaft support member placed on the coordinate input device, an operation member, a support plate, a first rotating plate, and a first member. When, in conjunction with the operation member, a state in which the support plate and the first rotating plate make contact with each other changes to a state in which the support plate and the first rotating plate are separated from each other, difference between a distance from an end portion of the first member to the coordinate input device and a distance from a detection end portion of the second member to the coordinate input device decreases.

7 Claims, 10 Drawing Sheets

(56) References Cited

U.S. PATENT DOCUMENTS

| | | | | |
|---|---|---|---|---|
| 2020/0004345 A1* | 1/2020 | Ju | ............... | G06F 3/0362 |
| 2020/0019263 A1* | 1/2020 | Korherr | ............... | G01D 5/3473 |
| 2020/0192494 A1* | 6/2020 | Chu | ............... | G06F 3/041 |
| 2020/0301547 A1* | 9/2020 | Mori | ............... | G06F 3/0488 |
| 2021/0149507 A1* | 5/2021 | Ujiie | ............... | G06F 3/0393 |
| 2021/0157437 A1* | 5/2021 | Ujiie | ............... | G06F 3/0488 |
| 2021/0181913 A1* | 6/2021 | Yasu | ............... | G06F 3/03 |

OTHER PUBLICATIONS

International Written Opinion issued in International Patent Application No. PCT/JP2019/047491 dated Feb. 25, 2020. 3 pages.

\* cited by examiner

OPERATION SUPPORT DEVICE

CROSS-REFERENCE TO RELATED APPLICATION(S)

This application is a continuation of PCT international application Ser. No. PCT/JP2019/047491 filed on Dec. 4, 2019 which designates the United States, incorporated herein by reference, and which claims the benefit of priority from Japanese Patent Application No. 2018-248627, filed on Dec. 28, 2018, incorporated herein by reference.

BACKGROUND

1. Technical Field

The present disclosure relates to an operation support device that supports input operations on an electrostatic capacitance-type coordinate input device.

2. Description of the Related Art

Japanese Patent No. 6342105 describes an operation support device that is placed on a touch panel configured to detect change in electrostatic capacitance or change in a contact region and supports input operations through the touch panel.

The operation support device described in Japanese Patent No. 6342105 provides a detection value of the electrostatic capacitance based on change in the area of an opposing region of a cushion member and the touch panel in accordance with a pushing state. It is however desired that a depression operation is detected more sensitively.

SUMMARY

An object of the present invention is to provide an operation support device that can detect a depression operation more sensitively.

An operation support device according to an aspect that supports an input operation on a coordinate input device configured to detect change in electrostatic capacitance, the operation support device comprising: a main shaft support member placed on the coordinate input device; a support plate that protrudes to an outer side of the main shaft support member in a radial direction, includes a plurality of first magnets arranged on one surface of the support plate in a circumferential direction, and is fixed to the main shaft support member; an operation member that covers the support plate and the main shaft support member; a first rotating plate that is located on the coordinate input device side of the support plate and includes a plurality of second magnets generating attractive force to the first magnets at positions overlapping with the first magnets in an up-down direction, the second magnets being arranged on one surface of the first rotating plate in a circumferential direction; a second rotating plate that is arranged on an inner side of the first rotating plate in the radial direction and is located on the coordinate input device side of the support plate; a conductive first member projecting toward the coordinate input device from the first rotating plate; and a conductive second member projecting toward the coordinate input device from the second rotating plate, wherein when, in conjunction with the operation member, a state in which the support plate and the first rotating plate make contact with each other changes to a state in which the support plate and the first rotating plate are separated from each other, difference between a distance from an end portion of the first member to the coordinate input device and a distance from a detection end portion of the second member to the coordinate input device decreases.

DETAILED DESCRIPTION OF THE PREFERRED EMBODIMENTS

Figure 1:
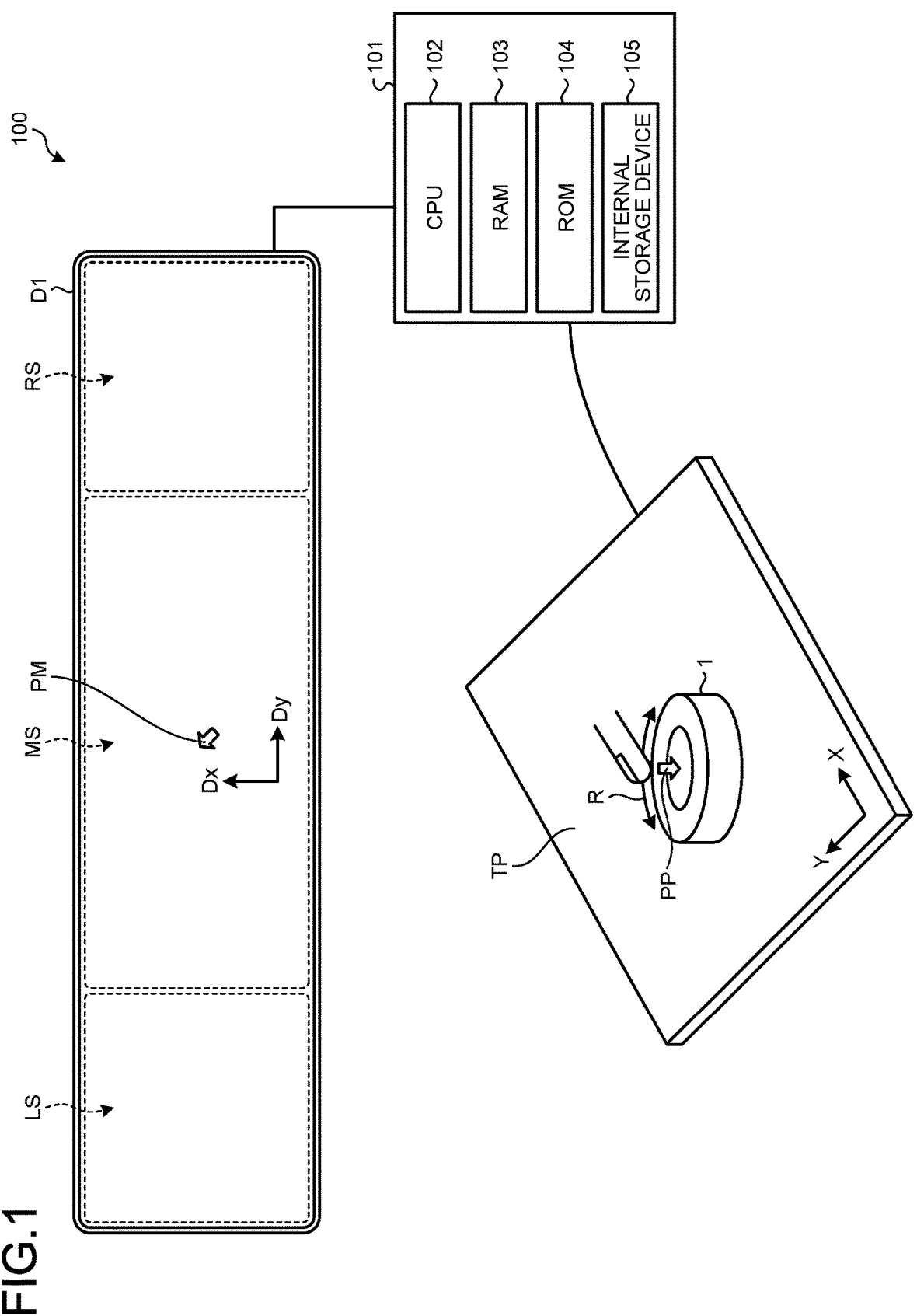
FIG. 1 is a descriptive view for explaining the configuration of an input system according to the embodiment.

A mode for carrying out the present disclosure (embodiment) will be described in detail with reference to the drawings. Contents described in the following embodiment do not limit the present disclosure. Components described below include those that can be easily assumed by those skilled in the art and substantially the same components. Furthermore, the components described below can be appropriately combined. The disclosure is merely an example, and appropriate modifications within the gist of the disclosure at which those skilled in the art can easily arrive are naturally encompassed in the range of the present disclosure. In the drawings, widths, thicknesses, shapes, and the like of the components can be schematically illustrated in comparison with actual modes for more clear explanation. They are however merely examples and do not limit interpretation of the present disclosure. In the present specification and the drawings, the same reference numerals denote components similar to those described before with reference to the drawing that has been already referred, and detail explanation thereof can be appropriately omitted.

Input System

FIG. 1 is a descriptive view for explaining the configuration of an input system according to the embodiment. As illustrated in FIG. 1, an input system 100 includes a display device D1, a control device 101, a coordinate input device TP, and an operation nob 1 as an operation support device. One direction of a plane of the display device D1 is a Dx direction, and a direction orthogonal to the Dx direction is a Dy direction.

The display device D1 has, for example, a display region MS, a display region LS, and a display region RS. A pointer PM is displayed on the display device D1.

The control device 101 is a what-is-called computer and includes a central processing unit (CPU) 102, a random access memory (RAM) 103, a read only memory (ROM) 104, and an internal storage device 105 such as a hard disc drive (HDD). The coordinate input device TP serves as an input unit of the control device 101 and is coupled to the control device 101.

A computer program such as a basic input output system (BIOS) is stored in the ROM 104.

The RAM 103 is a main memory in and from which computer programs and pieces of data can be recorded and read, provides a work area, and stores therein a plurality of computer programs for controlling the display device D1 and the coordinate input device TP.

The CPU 102 reads and executes the computer program stored in the RAM 103 and outputs an arithmetic result to the internal storage device 105 or the like.

An image provided by performing arithmetic processing necessary for display of graphics in the CPU 102 is displayed on the display device D1. The image provided by performing the arithmetic processing necessary for the display of graphics in the CPU 102 can be displayed also on the coordinate input device TP. The control device 101 can also be configured by a touch panel controller exclusive for capturing of signals from the coordinate input device TP and arithmetic processing thereon and a computer that performs the arithmetic processing necessary for the display of graphics on the display device D1.

The coordinate input device TP is a what-is-called touch panel having a display function and a coordinate input function, for example. The coordinate input device TP can display an image and receive change in electrostatic capacitance as coordinate input in an XY plane.

The operation nob 1 is an operation support device of the coordinate input device TP. The coordinate input device TP detects coordinates of the operation nob 1 in the XY plane. The coordinate input device TP detects a rotation operation R of the operation nob 1. The coordinate input device TP detects a depression operation PP of the operation nob 1.

In the input system 100, the pointer PM moves to any of the display region MS, the display region LS, and the display region RS by the rotation operation R of the operation nob 1, for example. When the depression operation PP acts on the operation nob 1, for example, the display region MS on which the pointer PM overlaps in the action of the depression operation PP is selected to be a target region for the following processing.

Operation Support Device

The operation nob 1 has a hollow cylindrical shape and has such a size that is fitted to the palm of a hand of an operator. The operation nob 1 need not have a hollow portion, and the hollow portion of the operation nob 1 may be used as a button for the depression operation PP.

Figure 2:
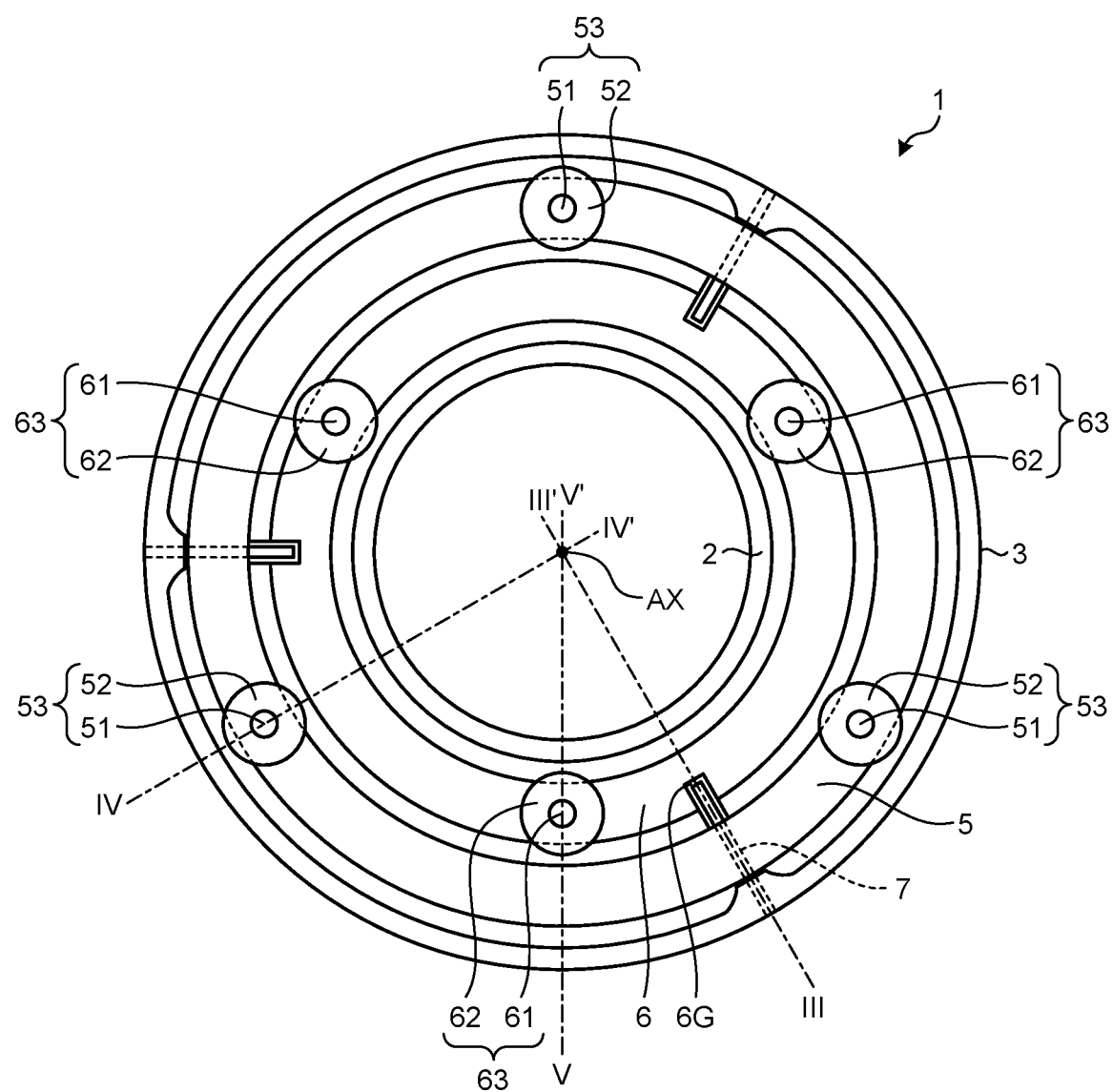
FIG. 2 is a plan view illustrating the rear surface of an operation support device in the embodiment.
Figure 3:
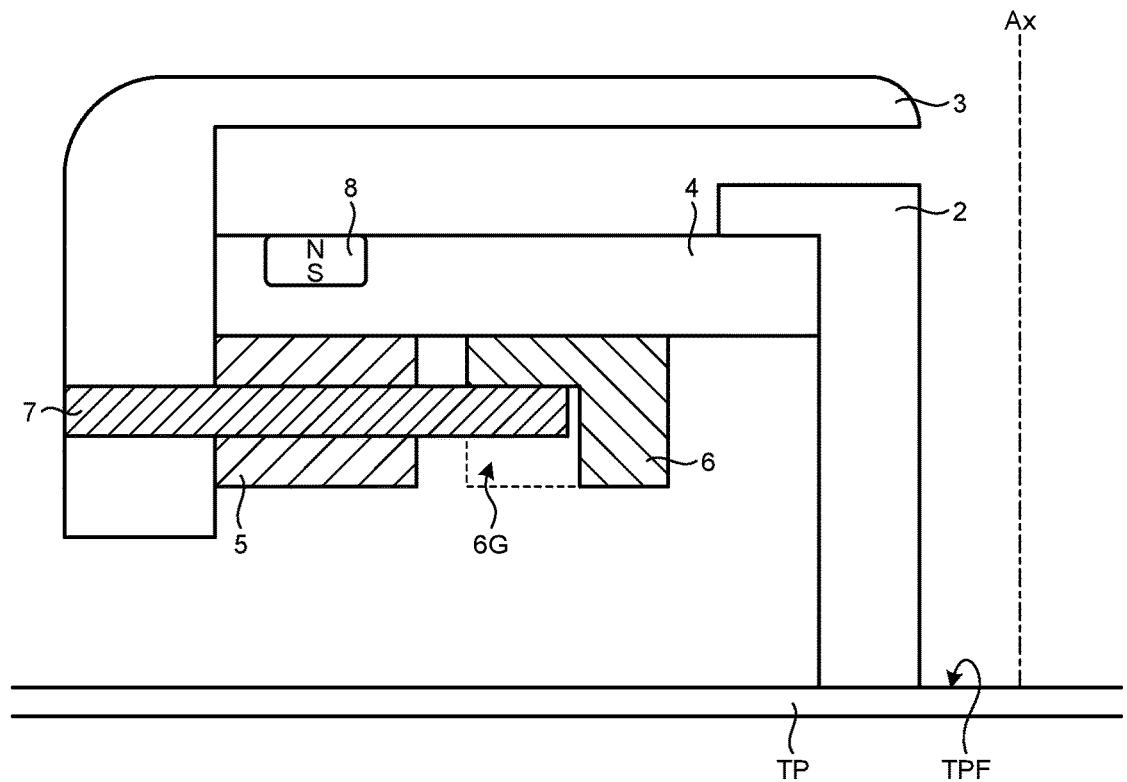
FIG. 3 is a cross-sectional view for explaining a state in which an operation member is not depressed in a cross section cut along line III-III' in FIG. 2.
Figure 4:
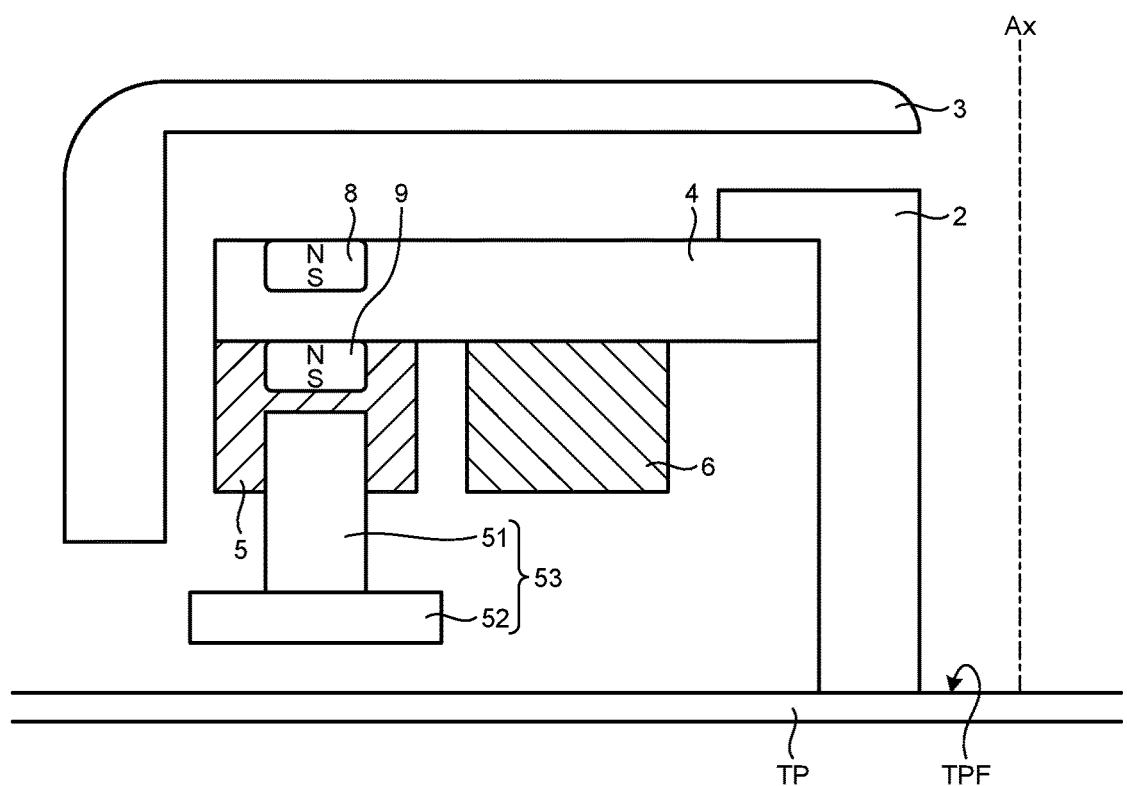
FIG. 4 is a cross-sectional view for explaining the state in which the operation member is not depressed in a cross section cut along line IV-IV' in FIG. 2.
Figure 5:
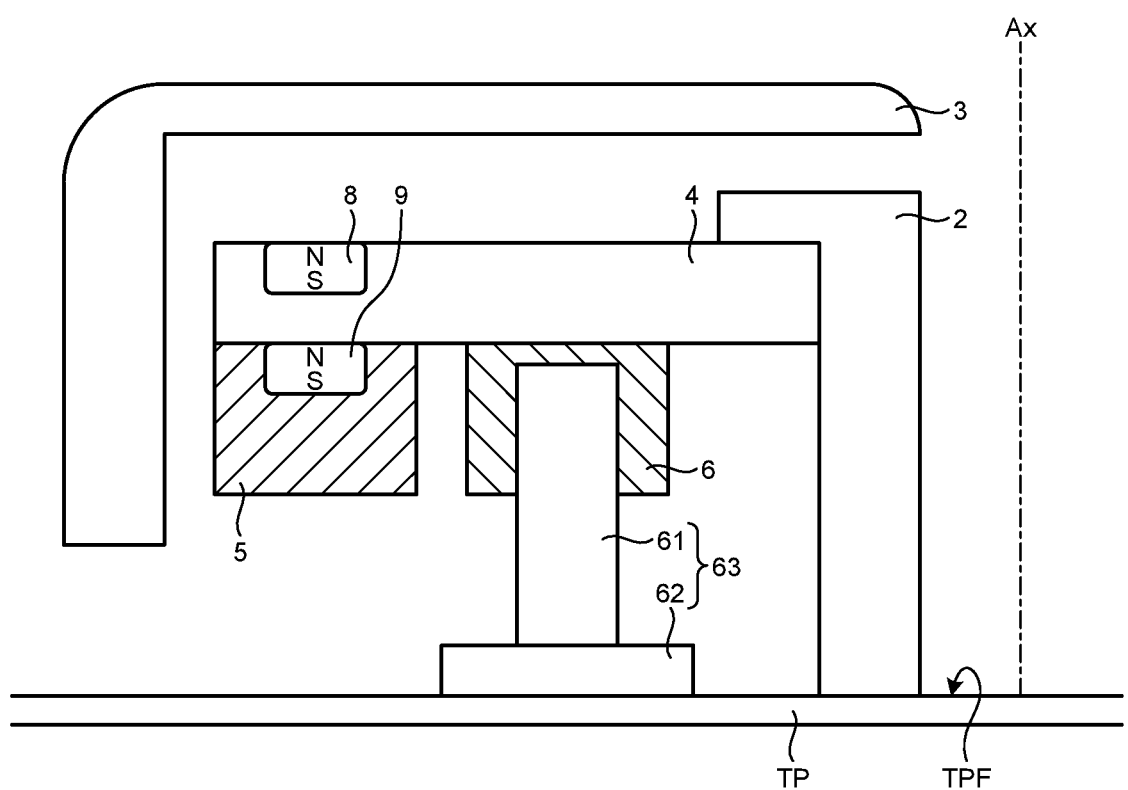
FIG. 5 is a cross-sectional view for explaining the state in which the operation member is not depressed in a cross section cut along line V-V' in FIG. 2.
Figure 6:
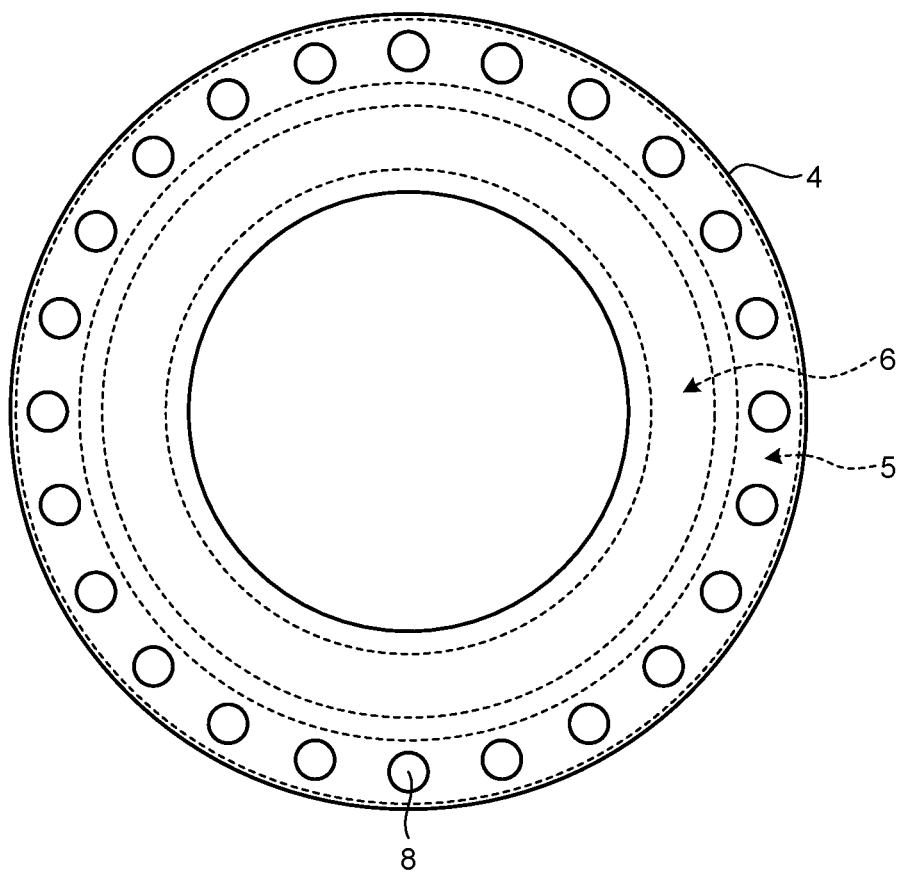
FIG. 6 is a plan view illustrating a plane of a support plate.
Figure 7:
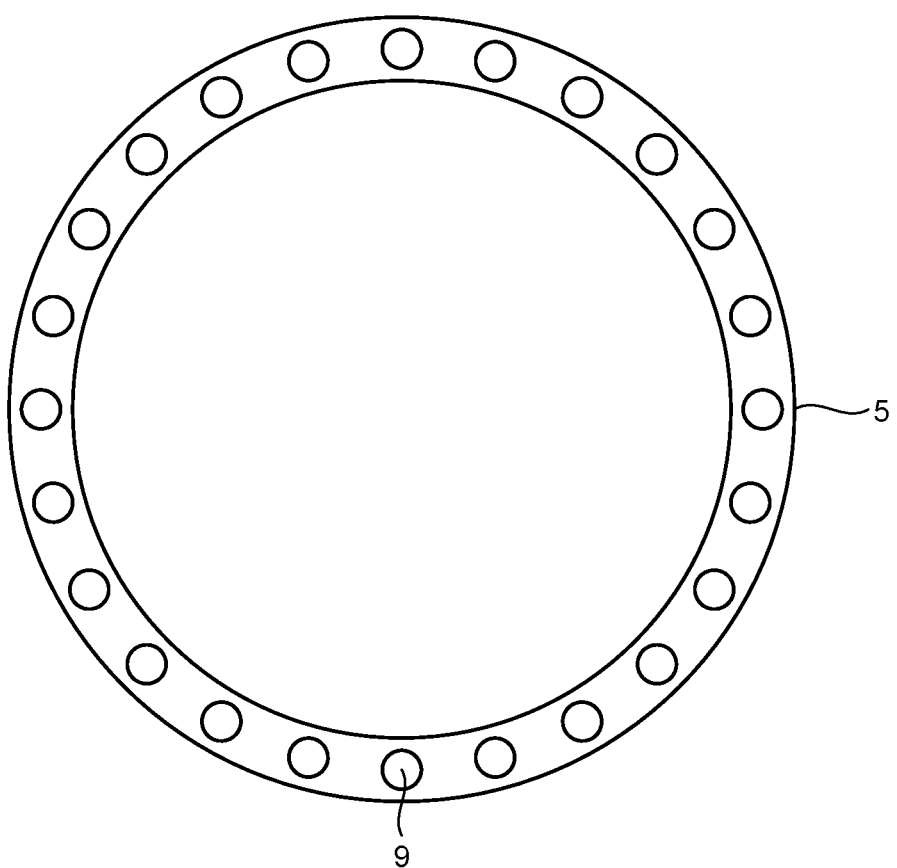
FIG. 7 is a plan view illustrating a first rotating plate.

FIG. 2 is a plan view illustrating the rear surface of the operation support device in the embodiment. FIG. 3 is a cross-sectional view for explaining a state in which an operation member is not depressed in a cross section cut along line III-III' in FIG. 2. FIG. 4 is a cross-sectional view for explaining the state in which the operation member is not depressed in a cross section cut along line IV-IV' in FIG. 2. FIG. 5 is a cross-sectional view for explaining the state in which the operation member is not depressed in a cross section cut along line V-V' in FIG. 2. FIG. 6 is a plan view illustrating a plane of a support plate. FIG. 7 is a plan view illustrating a first rotating plate.

As illustrated in FIG. 2, the operation nob 1 includes a main shaft support member 2, a support plate 4, a first rotating plate 5, a second rotating plate 6, three first members 53, and three second members 63. The first members 53 are arranged, for example, with intervals of 120° about a center axis Ax of the main shaft support member 2. The second members 63 are arranged, for example, with intervals of 120° about the center axis Ax.

As illustrated in FIG. 3, the main shaft support member 2, an operation member 3, and the support plate 4 are fixed with an adhesive, fixing pins, or the like to be integrated. The main shaft support member 2 is a hollow cylindrical member. The main shaft support member 2 is placed on an upper surface TPF of the coordinate input device TP. The main shaft support member 2 is made of, for example, insulating resin. The coordinate input device TP does not therefore detect the main shaft support member 2 even when the main shaft support member 2 is placed on the upper surface TPF of the coordinate input device TP. A lower end portion of the main shaft support member 2 makes contact with the coordinate input device TP.

The operation member 3 has an annular upper surface plate covering the main shaft support member 2 and the support plate 4 and a side surface portion covering the first rotating plate 5 from the outer side in the radial direction.

As illustrated in FIG. 2, FIG. 3, and FIG. 6, the support plate 4 is an annular plate-like member made of insulating resin. First magnets 8 are embedded in the upper surface of the support plate 4. The first magnets 8 are arranged side by side in the circumferential direction. The first magnets 8 are members that can be miniaturized, have high processing accuracy, and can be used in a wide temperature range, and are, for example, neodymium magnets.

As illustrated in FIG. 2 and FIG. 7, the first rotating plate 5 is an annular plate-like member. As illustrated in FIG. 4, FIG. 5, and FIG. 7, second magnets 9 are embedded in the upper surface of the first rotating plate 5. The second magnets 9 are members that can be miniaturized, have high processing accuracy, and can be used in a wide temperature range, and are, for example, neodymium magnets. The second magnets 9 are arranged side by side in the circumferential direction. When the first magnets 8 and the second magnets 9 are at positions overlapping with each other in the up-down direction, different polarities face each other. The first magnets 8 and the second magnets 9 thereby attract each other, so that attractive force acts between the support plate 4 and the first rotating plate 5. The support plate 4 and the first rotating plate 5 make contact with each other in a state in which the operation member 3 is not depressed.

The support plate 4 is interposed between the first magnets 8 and the second magnets 9, and the attractive force with which the first magnets 8 and the second magnets 9 attract each other can therefore be adjusted with the thickness of the support plate 4. Furthermore, the attractive force can also be adjusted also by setting the sizes and the mounting numbers of the first magnets 8 and the second magnets 9.

The first rotating plate 5 is made of a conductive material having lower magnetic permeability than that of carbon steel. The first rotating plate 5 is made of an alloy of copper and zinc in the embodiment. When the first rotating plate 5 is made of a material having higher magnetic permeability than that of carbon steel, a magnetic path inhibiting the attractive force between the first magnets 8 and the second magnets 9 is formed, and tactile feedback with the rotation operation R of the operation nob 1 can disappear. Although the first rotating plate 5 may be made of an insulating material, being made of a conductive material makes it possible to enhance the sensitivity to the first members 53 in the coordinate input device TP.

As illustrated in FIG. 2, the second rotating plate 6 is arranged on the inner side of the first rotating plate 5 in the radial direction and is an annular plate-like member. Although the second rotating plate 6 may be made of an insulating material, being made of a conductive material makes it possible to enhance the sensitivity to the second members 63 in the coordinate input device TP.

As illustrated in FIG. 2, a plurality of connection members 7 are columnar members provided in the circumferential direction and extending toward the center axis Ax. The connection members 7 are, for example, male screws made of metal. As illustrated in FIG. 2 and FIG. 3, the connection members 7 penetrate through the side surface portion of the operation member 3 and the first rotating plate 5 to connect the side surface portion of the operation member 3 and the first rotating plate 5. Front end portions of the connection members 7 that project from the inner side of the first rotating plate 5 in the radial direction are inserted into grooves 6G provided in the lower surface of the second rotating plate 6. The connection members 7 thereby connect the first rotating plate 5 and the second rotating plate 6 in accordance with the rotation operation R of the operation nob 1.

As illustrated in FIG. 4, the first members 53 are mounted on the first rotating plate 5 on the coordinate input device TP side. The first members 53 project toward the coordinate input device TP from the first rotating plate 5. Each first member 53 has a columnar shaft portion 51 giving no influence on the detection sensitivity of the coordinate input device TP and a disc-like end portion 52 having a size appropriate for the detection sensitivity of the coordinate input device TP. The first members 53 are conductive members and made of, for example, an alloy of copper and zinc.

As illustrated in FIG. 5, the second members 63 are mounted on the second rotating plate 6 on the coordinate input device TP side. The second members 63 project toward the coordinate input device TP from the second rotating plate 6. Each second member 63 has a columnar shaft portion 61 giving no influence on the detection sensitivity of the coordinate input device TP and a disc-like end portion 62 having a size appropriate for the detection sensitivity of the coordinate input device TP. The second members 63 are conductive members and made of, for example, an alloy of copper and zinc.

When the first rotating plate 5, the operation member 3, and the connection members 7 are conductive members, the first members 53 are easy to be conducted with the operator through the connection members 7, the first rotating plate 5, and the operation member 3 and the coordinate input device TP becomes easy to detect contact of the first members 53.

As illustrated in FIG. 2, the first members 53 are arranged at positions shifted from the second members 63 by 60° about the center axis Ax. The first members 53 may be arranged at the same positions as those of the second members 63 in the circumferential direction about the center axis Ax. The first members 53 are located at positions excluding positions on lines connecting the center axis Ax of the main shaft support member 2 and the respective second members 63 in the embodiment. Arrangement of the first members 53 and the second members 63 at different positions in the circumferential direction about the center axis Ax can prevent them from interfering with each other even when sizes of the end portions 52 and the end portions 62 are increased.

As illustrated in FIG. 4 and FIG. 5, the end portions 62 of the second members 63 are closer to the coordinate input device TP than the end portions 52 of the first members 53 are in the state in which the operation member 3 is not depressed. Gaps are formed between the end portions 52 of the first members 53 and the coordinate input device TP in the state in which the operation member 3 is not depressed. The sensitivity of the coordinate input device TP is set such that it does not detect the end portions 52 of the first members 53 in a state in which the support plate 4 and the first rotating plate 5 make contact with each other.

Figure 8:
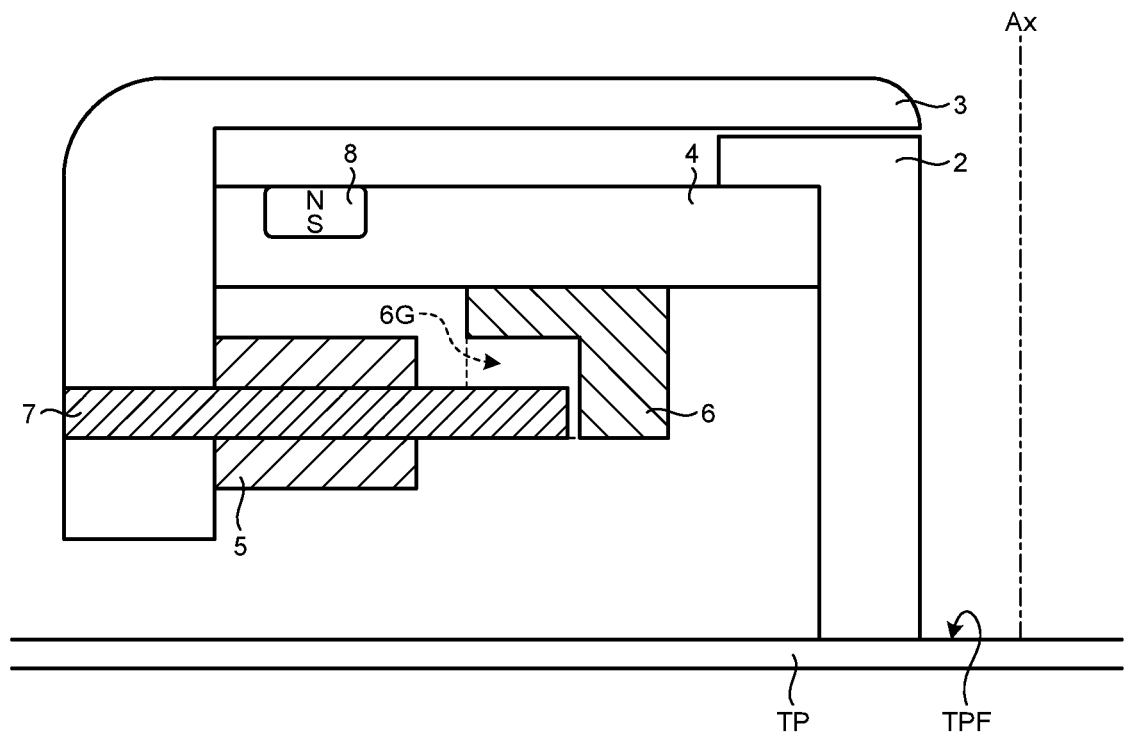
FIG. 8 is a cross-sectional view for explaining a state in which the operation member is depressed in the cross section cut along line III-III' in FIG. 2.
Figure 9:
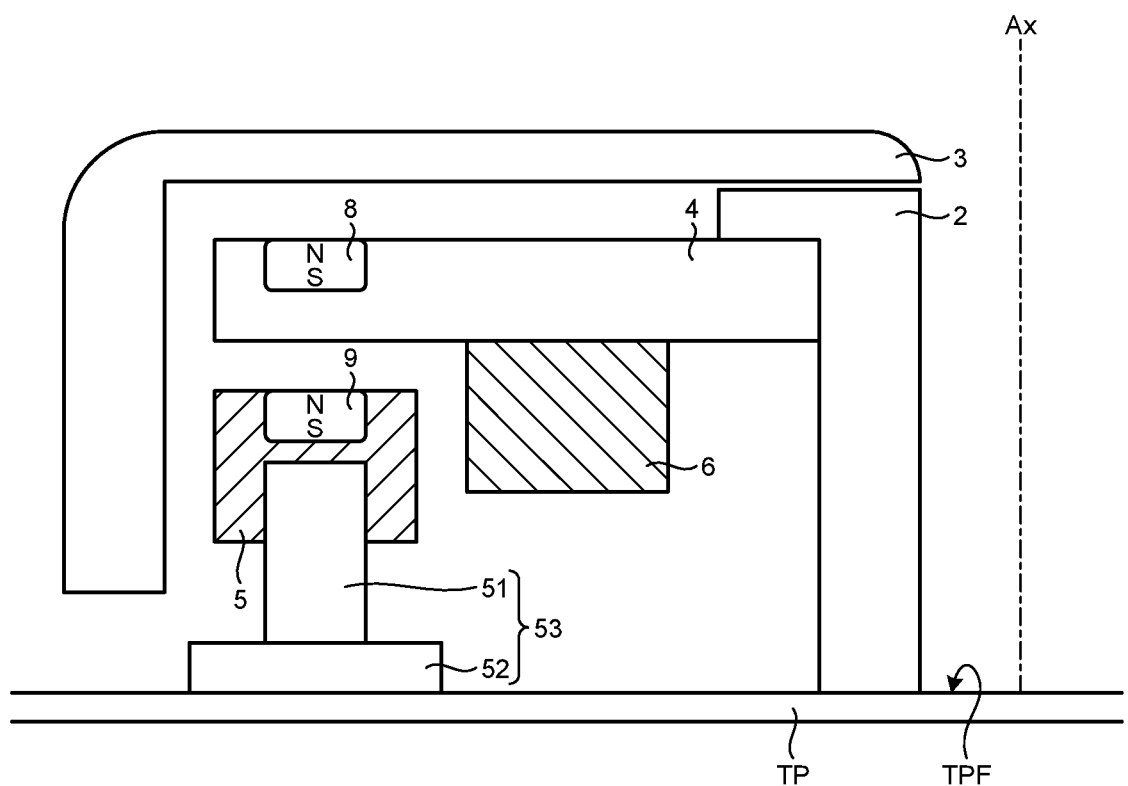
FIG. 9 is a cross-sectional view for explaining the state in which the operation member is depressed in the cross section cut along line IV-IV' in FIG. 2.
Figure 10:
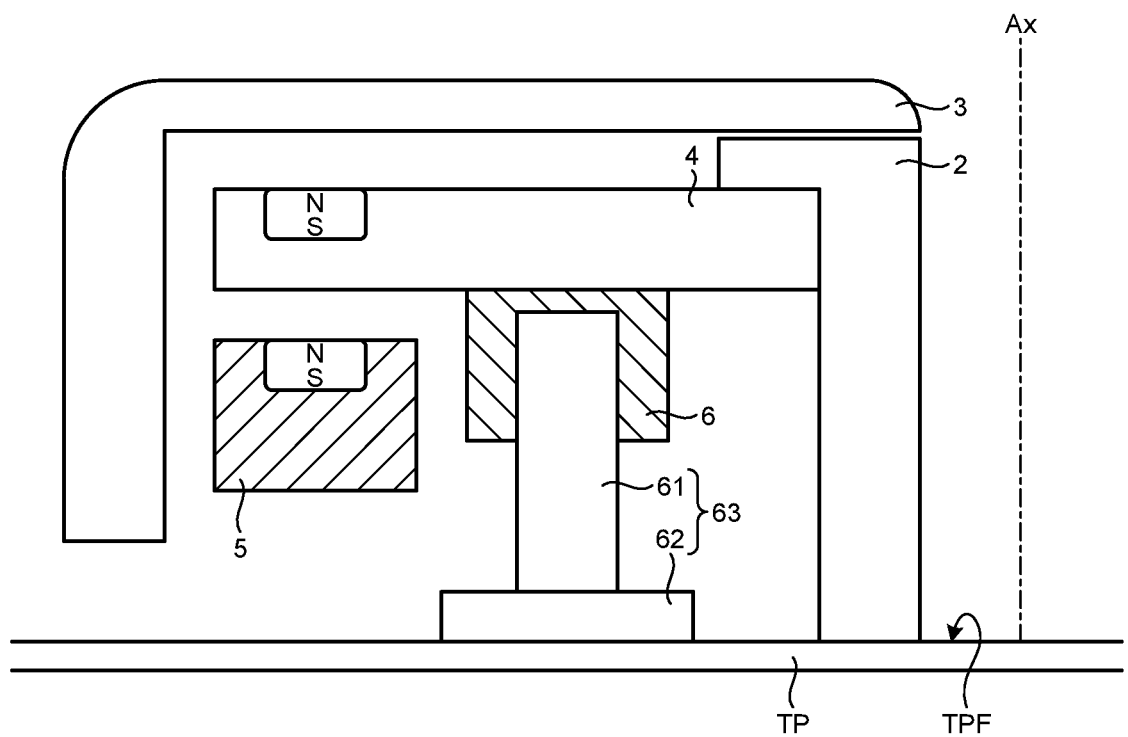
FIG. 10 is a cross-sectional view for explaining the state in which the operation member is depressed in the cross section cut along line V-V' in FIG. 2.

FIG. 8 is a cross-sectional view for explaining a state in which the operation member is depressed in the cross section cut along line III-III' in FIG. 2. FIG. 9 is a cross-sectional view for explaining the state in which the operation member is depressed in the cross section cut along line IV-IV' in FIG. 2. FIG. 10 is a cross-sectional view for explaining the state in which the operation member is depressed in the cross section cut along line V-V' in FIG. 2. As illustrated in FIG. 8, the support plate 4 and the first rotating plate 5 are separated from each other in the state in which the operation member 3 is depressed.

In other words, a distance from the main shaft support member 2 to the operation unit 3 when the first rotating plate 5 and the support plate 4 make contact with each other is larger than the distance from the main shaft support member 2 to the operation unit 3 when the first rotating plate 5 and the support plate 4 are separated from each other.

The front end portions of the connection members 7 are inserted into the grooves 6G provided in the lower surface of the second rotating plate 6 even when the support plate 4 and the first rotating plate 5 are separated from each other. The first rotating plate 5 and the second rotating plate 6 thereby rotationally move in conjunction with rotational movement of the operation member 3 even when the operation member 3 rotationally moves in the state in which the operation member 3 is depressed.

As illustrated in FIG. 9 and FIG. 10, when the operation member 3 is depressed from the state in which the operation member 3 is not depressed, difference between a distance from the end portions 52 of the first members 53 to the coordinate input device TP and a distance from the end portions 62 of the second members 63 to the coordinate input device TP decreases. With this configuration, when the coordinate input device TP detects the end portions 62 of the second members 63, it detects also the end portions 52 of the first members 53. The end portions 52 of the first members 53 and the coordinate input device TP make contact with each other in the state in which the operation member 3 is depressed in the embodiment.

As described above, the first magnets 8 and the second magnets 9 attract each other, so that the attractive force acts between the support plate 4 and the first rotating plate 5. When the depression operation PP of the operation nob 1 is canceled, the first rotating plate 5 is adsorbed to the support plate 4 and the state in which the operation member 3 is not depressed, which is illustrated in FIG. 3 to FIG. 5, is made again.

Figure 11A:
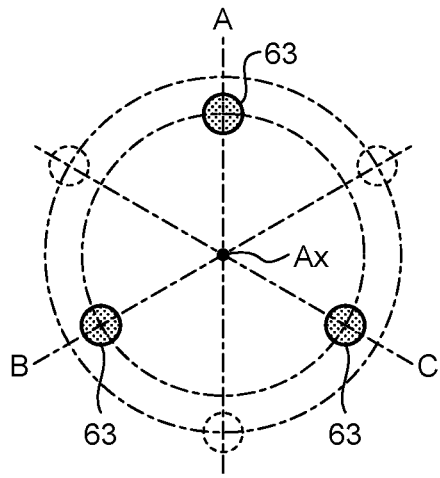
FIG. 11A is a plan view illustrating a plurality of member positions indicating a first rotation angle in the state in which the operation member is not depressed.
Figure 11B:
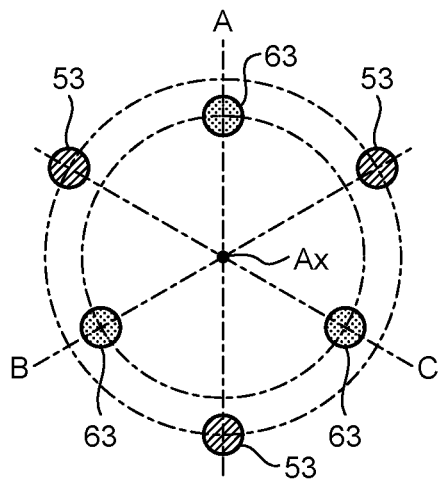
FIG. 11B is a plan view illustrating the member positions indicating the first rotation angle in the state in which the operation member is depressed.

The operation nob 1 can perform the following operation support. FIG. 11A is a plan view illustrating a plurality of member positions indicating a first rotation angle in the state in which the operation member is not depressed. FIG. 11B is a plan view illustrating the member positions indicating the first rotation angle in the state in which the operation member is depressed.

For example, as illustrated in FIG. 11A, the coordinate input device TP detects the three second members 63 in the state in which the operation member 3 is not depressed. The control device 101 can calculate the coordinates of the center point Ax from the respective coordinates of the three second members 63. The control device 101 can acquire the position of the operation nob 1 in the XY plane by regarding the coordinates of the operation nob 1 as the coordinates of the center axis Ax, for example.

The operation nob 1 is an operation support device that supports input operations on the coordinate input device TP configured to detect change in the electrostatic capacitance. The operation nob 1 includes the main shaft support member 2 placed on the coordinate input device TP, the operation member 3, the support plate 4, the first rotating plate 5, the second rotating plate 6, the first members 53, and the second members 63. The support plate 4 protrudes to the outer side of the main shaft support member 2 in the radial direction, includes the first magnets 8 arranged in one surface of the support plate 4 in the circumferential direction, and is fixed to the main shaft support member 2. The operation member 3 covers the support plate 4 and the main shaft support member 2. The first rotating plate 5 includes the second magnets 9 generating the attractive force to the first magnets 8 at the positions overlapping with the first magnets 8 in the up-down direction, the second magnets 9 being arranged in one surface of the first rotating plate 5 in the circumferential direction, and is located on the coordinate input device TP side of the support plate 4. The second rotating plate 6 is arranged on the inner side of the first rotating plate 5 in the radial direction and is located on the coordinate input device TP side of the support plate 4. The first members 53 are the conductive members projecting toward the coordinate input device TP from the first rotating plate 5. The second members 63 are the conductive members projecting toward the coordinate input device TP from the second rotating plate 6.

As illustrated in FIG. 1, when the depression operation PP of the operation nob 1 is performed, as described above, the difference between the distance from the end portions 52 of the first members 53 to the coordinate input device TP and the distance from the end portions 62 of the second members 63 to the coordinate input device TP decreases in conjunction with the operation member 3. The coordinate input device TP thereby detects the three second members 63 and the three first members 53.

When the operation member 3 is depressed in an inclined manner, the control device 101 does not recognize the depression operation PP of the operation nob 1 because one or two first member(s) 53 is(are) detected. When the control device 101 recognizes the depression operation PP of the operation nob 1 with depression of the operation 3 and detection of the three first members 53 and executes processing assigned to the depression operation PP of the operation nob 1, execution of processing with an erroneous operation can be prevented.

Figure 11C:
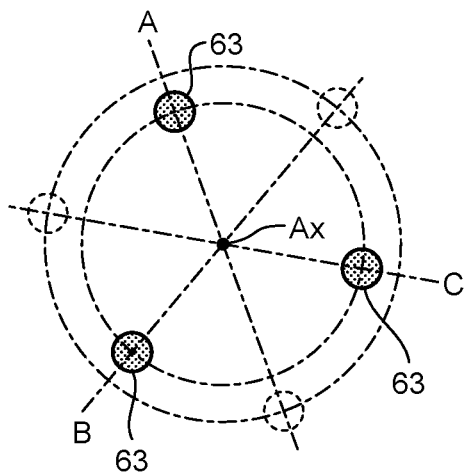
FIG. 11C is a plan view illustrating the member positions indicating a second rotation angle in the state in which the operation member is not depressed.

As illustrated in FIG. 11A, directions of the respective second members 63 from the center axis Ax are assumed to be an azimuth A, an azimuth B, and an azimuth C. FIG. 11C is a plan view illustrating the member positions indicating a second rotation angle in the state in which the operation member is not depressed. When the operation nob 1 rotates leftward to the second rotation angle illustrated in FIG. 11C from the first rotation angle illustrated in FIG. 11A, the control device 101 can acquire the rotation angle of the operation nob 1 by calculating angle difference between the direction of the azimuth A from the center axis Ax in FIG. 11A and the direction of the azimuth A from the center axis Ax in FIG. 11C. Although the azimuth A has been described, the calculation based on the azimuth A can be used for calculation based on the azimuth B or the azimuth C.

The second magnets 9 generating the attractive force to the first magnets 8 at the positions overlapping with the first magnets 8 in the up-down direction are arranged in one surface of the first rotating plate 5 in the circumferential direction in the operation nob 1.

With these magnets, the attractive force between the first magnets 8 and the second magnets 9 holds relative rotation positions of the first rotating plate 5 and the support plate 4 in the case of the absence of rotation operation R of the operation nob 1. The operation member 3 rotationally moves relative to the main shaft support member 2 with the rotation operation R of the operation nob 1. The second magnets 9 generating the attractive force to the first magnets 8 at the positions overlapping with the first magnets 8 in the up-down direction move and generate the attractive force to the first magnets 8 adjacent thereto next, and tactile feedback with the rotation operation R of the operation nob 1 is transmitted to the operator of the operation nob 1. That is to say, feeling, which is called click feeling, is transmitted to the operator of the operation nob 1 with the rotation operation R of the operation nob 1.

Figure 11D:
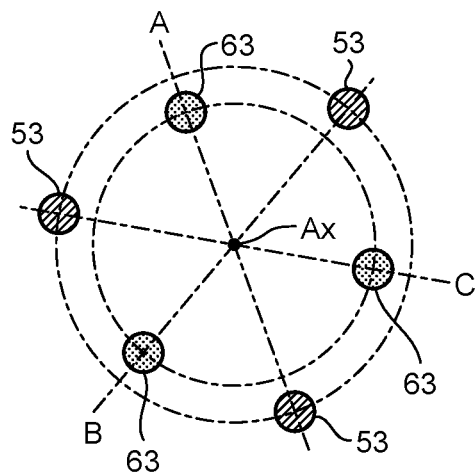
FIG. 11D is a plan view illustrating the member positions indicating the second rotation angle in the state in which the operation member is depressed.

FIG. 11D is a plan view illustrating the member positions indicating the second rotation angle in the state in which the operation member is depressed. When the coordinate input device TP detects the three second members 63 and the three first members 53 as illustrated in FIG. 11D, the rotation angle of the operation nob 1 may be acquired by calculating angle difference between the direction of the azimuth A from the center axis Ax in FIG. 11A and the direction of the azimuth A from the center axis Ax in FIG. 11D.

Figure 11E:
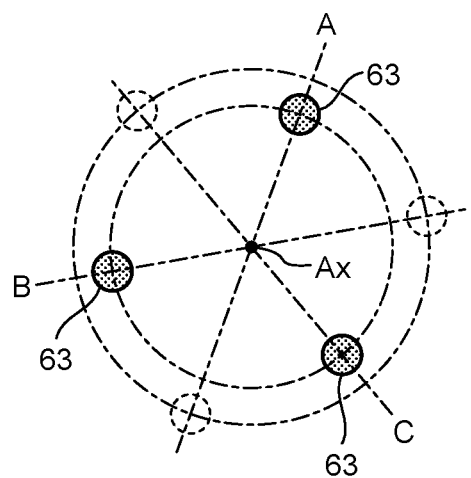
FIG. 11E is a plan view illustrating the member positions indicating a third rotation angle in the state in which the operation member is not depressed.

The coordinate input device TP can detect also when the operation nob 1 rotates rightward. FIG. 11E is a plan view illustrating the member positions indicating a third rotation angle in the state in which the operation member is not depressed. When the operation nob 1 rotates rightward to the third rotation angle illustrated in FIG. 11E from the first rotation angle illustrated in FIG. 11A, the control device 101 can acquire the rotation angle of the operation nob 1 by calculating angle difference between the direction of the azimuth A from the center axis Ax in FIG. 11A and the direction of the azimuth A from the center axis Ax in FIG. 11D. Although the azimuth A has been described, the calculation based on the azimuth A can be used for calculation based on the azimuth B or the azimuth C.

Figure 11F:
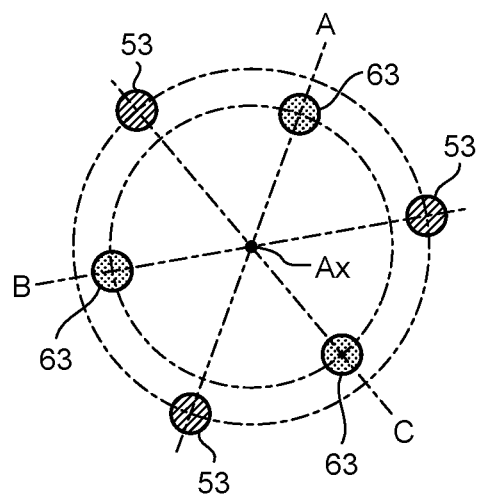
FIG. 11F is a plan view illustrating the member positions indicating the third rotation angle in the state in which the operation member is depressed.

FIG. 11F is a plan view illustrating the member positions indicating the third rotation angle in the state in which the operation member is depressed. When the coordinate input device TP detects the three second members 63 and the three first members 53 as illustrated in FIG. 11F, the rotation angle of the operation nob 1 may be acquired by calculating angle difference between the direction of the azimuth A from the center axis Ax in FIG. 11A and the direction of the azimuth A from the center axis Ax in FIG. 11F.

Although the preferred embodiment has been described above, the present disclosure is not limited by the embodiment. Contents disclosed in the embodiment are merely examples, and various modifications can be made in a range without departing from the gist of the present disclosure. Appropriate modifications in a range without departing from the gist of the present disclosure naturally belong to the technical range of the present disclosure.

For example, although a plane defined by the direction X and the direction Y is the upper surface TPF of the coordinate input device TP, the upper surface TPF of the coordinate input device TP may be curved. Although the coordinate input device TP is the touch panel, it may be a touch pad without a display function.

Although the magnets are used for attraction and repulsion of the first rotating plate and the second rotating plate, members such as rubber and springs may be used instead.

What is claimed is:

1. An operation support device that supports an input operation on a coordinate input device configured to detect change in electrostatic capacitance, the operation support device comprising:
   a main shaft support member placed on the coordinate input device;
   a support plate that protrudes to an outer side of the main shaft support member in a radial direction, includes a plurality of first magnets arranged on one surface of the support plate in a circumferential direction, and is fixed to the main shaft support member;
   an operation member that covers the support plate and the main shaft support member;
   a first rotating plate that is located on the coordinate input device side of the support plate and includes a plurality of second magnets generating attractive force to the first magnets at positions overlapping with the first magnets in an up-down direction, the second magnets being arranged on one surface of the first rotating plate in a circumferential direction;
   a second rotating plate that is arranged on an inner side of the first rotating plate in the radial direction and is located on the coordinate input device side of the support plate;
   a conductive first member projecting toward the coordinate input device from the first rotating plate; and
   a conductive second member projecting toward the coordinate input device from the second rotating plate,
   wherein
   when, in conjunction with the operation member, a state in which the support plate and the first rotating plate make contact with each other changes to a state in which the support plate and the first rotating plate are separated from each other, difference between a distance from an end portion of the first member to the coordinate input device and a distance from a detection end portion of the second member to the coordinate input device decreases.

2. The operation support device according to claim 1, wherein three second members are provided.

3. The operation support device according to claim 1, wherein
   three second members are provided, and
   the first member is located at a position excluding positions on lines connecting a center axis of the main shaft support member and the respective second members.

4. The operation support device according to claim 3, wherein the second members are arranged with intervals of 120° about the center axis of the main shaft support member.

5. The operation support device according to claim 1, wherein three first members are provided.

6. The operation support device according to claim 5, wherein the first members are arranged with intervals of 120° about a center axis of the main shaft support member.

7. The operation support device according to claim 1, further comprising a connection member connecting the operation member, the first rotating plate, and the second rotating plate.

\* \* \* \* \*